United States Patent [19]

Chang

[11] 4,284,740

[45] Aug. 18, 1981

[54] ACRYLATE COPOLYMERS GRAFTED ONTO A POLAR, WATER-SOLUBLE BACKBONE POLYMER

[75] Inventor: Eugene Y. C. Chang, Bridgewater, N.J.

[73] Assignee: American Cyanamid Co., Stamford, Conn.

[21] Appl. No.: 136,127

[22] Filed: Mar. 31, 1980

Related U.S. Application Data

[63] Continuation of Ser. No. 965,115, Nov. 30, 1978, abandoned.

[51] Int. Cl.$^3$ .................... C08F 265/10; C08F 261/04
[52] U.S. Cl. .................... 525/292; 260/17 A; 525/404; 525/285; 525/59
[58] Field of Search .............. 525/292, 285, 404, 59; 260/17 A

[56] References Cited

U.S. PATENT DOCUMENTS

| | | | |
|---|---|---|---|
| 2,848,434 | 8/1958 | Hellmann | 260/883 |
| 3,026,289 | 3/1962 | Coover | 260/883 |
| 3,026,293 | 3/1962 | Caldwell et al. | 260/883 |
| 3,461,052 | 8/1969 | Restaino et al. | 264/159.12 |
| 3,502,745 | 3/1970 | Minton | 260/878 |
| 3,745,196 | 7/1973 | Lane et al. | 260/881 |
| 3,843,753 | 10/1974 | Owens | 260/876 R |
| 3,939,128 | 2/1976 | Behrens | 260/79.5 P |
| 4,092,303 | 5/1978 | Behrens | 260/79.5 P |

*Primary Examiner*—Carman J. Seccuro
*Attorney, Agent, or Firm*—Frank M. Van Riet

[57] ABSTRACT

Vulcanizable compositions comprising a polar, water-soluble backbone polymer having a copolymer of an acrylic acid ester and a curing-site containing comonomer grafted thereon and a method for the production thereof, are disclosed.

11 Claims, No Drawings

ACRYLATE COPOLYMERS GRAFTED ONTO A POLAR, WATER-SOLUBLE BACKBONE POLYMER

This is a continuation of application Ser. No. 965,115, filed Nov. 30, 1978, now abandoned.

BACKGROUND OF THE INVENTION

Polyacrylate elastomers are well-known and widely used in applications where low temperature flexibility and resistance to hydrocarbon oils is important, e.g., in automotive applications; see Kaizerman, U.S. Pat. No. 3,201,373; and Vial, Rubber Chem. and Tech. 44, 344–362 (1971).

Particularly useful polyacrylate elastomers are those comprising a major proportion of one or more alkyl acrylates wherein the alkyl group contains 2–8 carbon atoms copolymerized with a minor proportion of an active-halogen containing ethylenically unsaturated co-monomer, such as vinyl chloroacetate, vinyl chloroethyl ether, 2-chloroethyl acrylate, and the like. Copolymers of ethyl acrylate and vinyl chloroacetate provide outstanding resistance to swelling in contact with hydrocarbon oils, but only a moderately low glass transition temperature ($\sim -18°$ C.). Copolymers of butyl acrylate and vinyl chloroacetate, on the other hand, have outstanding low temperature properties (Tg $\sim -44°$ C.) but relatively poor resistance to hydrocarbon oils. Combinations of ethyl acrylate and butyl acrylate provide elastomers having intermediate properties. Other means have been suggested for improving the hydrocarbon oil resistance of butyl acrylate copolymers, such as copolymerization with 2-cyanoethyl acrylate (see Aloia, U.S. Pat. No. 3,397,193); or providing copolymers of combinations of monomers, such as alkoxyalkyl acrylates and alkylthioalkyl acrylates. Invariably, improvement in one of the properties is achieved at the sacrifice of the other.

SUMMARY

The present invention provides vulcanizable elastomer compositions, and a method for their preparation, having the low Tg of a butyl acrylate-vinyl chloroacetate copolymer and greatly improved resistance to swelling in hydrocarbon oils.

While the present invention has as its major object the preparation of an acrylate elastomer having a low Tg and greatly improved oil resistance, in its broader applications it provides means for improving the oil resistance of any polyacrylate elastomer while essentially retaining the Tg of the polyacrylate. Stated in another way, the Tg of the polyacrylate elastomer is retained and improved oil resistance is imparted by the polar, water-soluble or water-dispersible backbone polymer.

DESCRIPTION OF THE INVENTION INCLUDING PREFERRED EMBODIMENTS

The graft elastomers of the invention contain about 20 to 40 percent by weight, based on the total weight of the elastomer, of a polar, water-soluble or water-dispersible backbone polymer and grafted thereon from about 60 to 80 percent, by weight, same basis, of a mixture of (A) a major proportion of one or more acrylic acid esters and (B) a minor proportion of an ethylenically unsaturated comonomer containing a cure-site for sulfur vulcanization.

Examples of polar, water-soluble or water-dispersible polymers useful in accordance with the present invention are water-soluble cellulose derivatives, for example, hydroxyethyl cellulose and methoxy ethyl cellulose; polyethylene glycols and methoxy polyethylene glycols; polyvinyl alcohol; polymers of acrylamide, methacrylamide, acrylonitrile, methacrylonitrile, acrylic acid, methacrylic acid, maleic acid, fumaric acid, and the like. Preferred backbone polymers include homopolyacrylamide and copolymers of acrylamide and a minor proportion of acrylonitrile and/or acrylic acid. The polymers are either water soluble (preferable) or produce an essentially complete solution, i.e., a finely divided, readily dispersed solid phase; the latter being ofttimes characterized as "hazy solutions". The amount of the backbone polymer, as a percentage of the final grafted elastomer, will preferably range from about 25 to 30 weight percent.

The ethylenically unsaturated comonomer which provides the cure-site for sulfur vulcanization can be either a halogen (e.g. bromine or chlorine) containing monomer or a carbon to carbon double bond containing monomer.

Preferably the ethylenically unsaturated comonomer which provides the cure-site to the elastomer is a halogen containing monomer. It is used in such an amount as to provide in the final graft elastomer between about 1.0 and 10.0%, halogen, by weight.

When the cure-site is provided by a comonomer containing carbon to carbon unsaturation (e.g. a vinyl group) the comonomer should provide in the final graft elastomer from about 2.0 to about 15.0%, by weight, of unsaturation.

In both instances, i.e. where the cure-site providing comonomer is either halogen containing or unsaturation containing, sufficient monomer is used so as to create in the graft elastomer the amount desired and the remaining grafted monomer constitutes the acrylic ester or mixture of acrylic esters so as to create in the final graft elastomer the above set forth amount of grafted monomers.

The amount of monomers grafted onto the polymer backbone will preferably constitute about 70–75%, by weight, same basis as above.

Particularly useful monomers for grafting onto the polymer backbone are the $C_2$–$C_8$ alkyl acrylates such as ethyl acrylate, t-butyl acrylate, cyclohexyl acrylate, n-octyl acrylate and the like.

The mixture of acrylate monomers which are to be grafted onto the backbone polymer may include, in addition to a major proportion of acrylic acid esters and a minor proportion of a cure-site containing monomer, a minor amount of one or more ethylenically unsaturated, copolymerizable monomers, such as acrylonitrile, styrene, vinyl chloride, and the like.

Active halogen containing monomers which may be used include those represented by the formula:

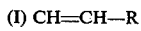

Illustrative examples of R include:

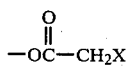

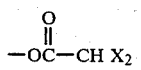

-continued

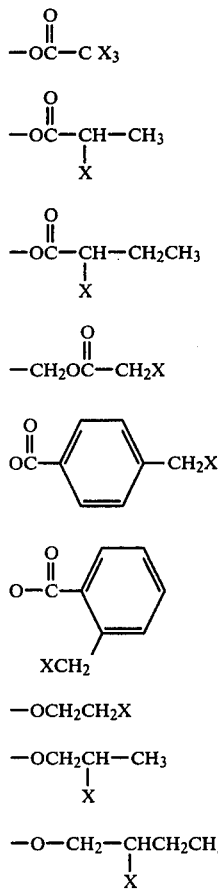

wherein X is a halogen atom, preferably chlorine or bromine. Nonhalogen-containing monomers which may be grafted onto the water-soluble or dispersible polymer backbones to provide carbon-to-carbon unsaturation cure-sites for sulfur vulcanization include such polyunsaturated monomers as allyl acrylate, crotyl acrylate, ethylidene norbornene, and the like. Vinyl chloroacetate is the preferred cure-site-containing grafting comonomer.

The grafted polymer segments of the elastomers of the present invention are prepared by a grafting procedure whereby a mixture of the acrylic acid esters and the cure-site-containing monomer are polymerized or grafted onto the water-soluble or water-dispersible copolymer backbone. The monomers to be grafted, along with the backbone polymer in powder or pellet form, are preferably first heated to about 60°–80° C. to swell the monomers into the polymer. A suitable free radical catalyst, such as tertiary butyl peroctoate, benzoyl peroxide and the like, is then added, and the monomers are polymerized at about 80° C. The polymer is then isolated, washed, and dried in a known manner.

The graft elastomers are compounded by conventional means, e.g., by Banbury mixer, two-roll rubber mill, etc. Sulfur, sulfur donors, accelerators, antioxidants, carbon black, other fillers and additives, as are commonly employed in the formulation of acrylic elastomers and the like, may be used in the vulcanization system; notably, the methods of Mihal, U.S. Pat. No. 3,458,461, and Behrens, U.S. Pat. No. 3,506,624, may be used to vulcanize the elastomers. The compounded vulcanizable elastomer may then be fabricated into useful articles by conventional means, e.g., by compression molding, extrusion, and the like.

The glass transition temperature (Tg) of the vulcanized elastomer compositions is determined according to thermomechanical analysis (TMA), as described by Levy in "Thermal Analysis—an Overview," *American Laboratory*, January, 1970, and in DuPont publication No. TA50 "Thermal Analysis", available from Instrument Products, Scientific and Process Division, Wilmington, Del.

The percent swell is measured according to ASTM D471-55T, and is given as percent volume swell when the sample is immersed in ASTM Oil #3 at 150° C. for 70 hours.

The following examples illustrate the invention.

EXAMPLE A

Preparation of Butyl Acrylate-Vinyl Chloroacetate Copolymer

A mixture of 46 parts of butyl acrylate, 3 parts of vinyl chloroacetate, 200 parts water, 1 part of sodium lauryl sulfate and 0.2 part of ammonium persulfate is prepared at room temperature with a nitrogen sparger. To this mixture are added 0.2 part of sodium sulfite dissolved in 10 parts water and 2 parts of a 0.15% solution of ferrous sulfate. A strong exotherm carries the temperature to 60° C. after 30 minutes, at which point the reaction is essentially completed. The resulting emulsion is coagulated in 10% salt solution, filtered, washed with water and dried to give a 94/6-butyl acrylate/vinyl chloroacetate copolymeric elastomer.

100 Parts, by weight, of the above elastomer is compounded according to conventional procedures on a standard 2-roll mill as follows:

| Formulation | Parts by Weight |
|---|---|
| Elastomer | 100 |
| Carbon black | 60 |
| Di-β-naphthyl-p-phenylenediamine | 2 |
| Stearic acid | 1.5 |
| Sulfur | 0.25 |
| Sodium 2-ethylhexanoate (50% inert) | 8.0 |

The compounded elastomer is compression molded for 30 minutes at 320° F. and then post-cured in an air oven for 4 hours at 350° F. Physical properties are given in Table II below.

TABLE II

| Polymer of Example | Shore A Hardness | Tensile, psi | Elongation, % | Volume* Swell, % | Tg° C. |
|---|---|---|---|---|---|
| A | 81 | 1100 | 130 | 96 | −44.5 |
| 1 | 89 | 925 | 70 | 57 | −43 |
| 2 | 90 | 1300 | 90 | 55 | −40 |
| 3 | 90 | 545 | 120 | 40.4 | −44 |

Note:
*ASTM D471-55T; 70 hours at 150° C. in ASTM Oil = 3

EXAMPLE 1

Preparation of Graft Polymer of Butyl Acrylate-Vinyl Chloroacetate on an Acrylamide-Acrylonitrile Copolymer A. The following reaction mixture is heated at 70° C. for 5 hours:

| | |
|---|---|
| Acrylamide | 80 parts |
| Acrylonitrile | 20 parts |
| Water | 800 parts |
| Isopropanol | 20 parts |
| Ammonium persulfate | 0.2 part |

Following completion of the reaction, the mixture is allowed to stir at 75°–80° C. to remove the isopropanol. The solution has a solids content of 11.5%.

B. To 260 parts of the polymer solution from A, containing 30 parts of solids, are added 2 parts of sodium lauryl sulfate, 7.2 parts of vinyl chloroacetate, 82.8 parts of butyl acrylate and 0.45 parts of ammonium presulfate. Then, 3 parts of 0.15% solution of ferrous sulfate and 0.3 part of sodium sulfate dissolved in 10 parts water are added, with nitrogen bubbling through the reaction mixture. In 2–3 minutes an exotherm starts which carries the temperature to 70° C. The reaction mixture is held at 65°–70° C. for an additional 15 minutes and the reaction mixture is then coagulated in a large volume of methanol, filtered and dried. Yield is 109 parts, 91%. The elastomer is compounded and cured as in Example A. Data are shown in Table II.

EXAMPLE 2

Preparation of Graft Polymer of Butyl Acrylate-Vinyl Chloroacetate on a Copolymer of Acrylamide-Acrylic Acid A solution is prepared containing 40 parts of a copolymer of 90% acrylamide and 10% acrylic acid, having a molecular weight of about 200,000, in 400 parts of water, to which was added 3.2 parts of sodium lauryl sulfate. To this solution are added 110.4 parts of butyl acrylate and 9.6 parts of vinyl chloroacetate (92 and 8 weight percent, respectively), and then 0.6 part of ammonium persulfate dissolved in 10 parts water and 4 parts of a 0.15% solution of ferrous sulfate are added, followed by 0.4 part of sodium sulfate dissolved in 10 ml. water. The reaction mixture exotherms to 54° C. after 30 minutes. The polymer is coagulated in a large volume of methanol, filtered, washed and dried. There is obtained 131.5 parts, 80.6% yield. The polymer is compounded and cured as in Example A. Data are given in Table II.

EXAMPLE 3

Preparation of Graft Polymer of Butyl Acrylate-Vinyl Chloroacetate on a Polymer of Acrylamide A solution is prepared containing 60 parts of a homopolymer of acrylamide (molecular weight about 100,000) in 270 parts water containing 4 parts of sodium lauryl sulfate. To this solution are added 169 parts of butyl acrylate, 11 parts of vinyl chloroacetate and 0.2 part of ammonium persulfate. The reaction mixture is heated to 80° C. for 3 hours and the resulting emulsion precipitated from a large volume of methanol, filtered and dried. There is obtained 188.5 parts of polymer, 78.5% yield. The elastomer is compounded and cured as in Example A. Data are shown in Table II.

EXAMPLE 4

The graft polymers of Examples 1–3 are fractionated by soaking the polymers overnight in water, filtering, washing with water, and drying. The water-soluble fraction comprises ungrafted backbone polymer. The water-insoluble fraction comprises the graft polymer. Analysis for nitrogen in both the washed and unwashed polymer fractions given a measure of grafting efficiency. The results are set forth in Table I, below.

TABLE I

| Polymer of Example | Theory | Unwashed | Washed | Efficiency |
|---|---|---|---|---|
| 1 | 5.26 | 4.92 | 4.23 | 86 |
| 2 | 4.50 | 4.32 | 1.23 | 28.5 |
| 3 | 4.92 | 4.98 | 2.40 | 48 |

EXAMPLE 5

The procedure of Example 1 is again followed except that the butyl acrylate is replaced by a 50/50 mixture of ethyl acrylate and butyl acrylate. Upon vulcanization, excellent properties are achieved.

EXAMPLES 6–8

The procedure of Example 1 is again followed except that the acrylonitrile is replaced by equivalent amounts of (6) methacrylonitrile, (7) maleic acid and (8) methacrylic acid. In each instance, the resultant grafted elastomer, upon vulcanization, exhibits excellent low temperature properties and oil resistance.

EXAMPLES 9–13

The procedure of Example 2 is followed except that the acrylamide/acrylic acid copolymer is replaced by (9) hydroxyethyl cellulose, (10) polyethylene glycol, (11) polyacrylic acid (12) polyacrylonitrile and (13) polyvinylacohol. Again, elastomers are produced, after vulcanization, having fine properties.

EXAMPLE 14

Following the procedure of Example 3, n-octyl acrylate and vinyl chloroacetate are grafted onto polyacrylamide. The resultant vulcanized elastomer exhibits acceptable low temperature properties and oil resistance.

EXAMPLE 15

The procedure of Example 1 is followed except that the vinyl chloroacetate is replaced by vinylchloroethyl ether. Similar results are achieved.

EXAMPLE 16

Replacement of the vinyl chloroacetate of Example 2 with allyl chloroacetate results in the production of an excellent vulcanized elastomer.

EXAMPLE 17

The vinyl chloroacetate of Example 3 is replaced by sufficient allyl acrylate so as to provide 7.5% carbon-to-carbon unsaturation in the resultant grafted elastomer. When vulcanized, the elastomer exhibits excellent properties.

I claim:

1. A sulfur vulcanizable elastomer composition comprising (A) from about 20 to 40 weight percent, based on the total weight of said vulcanizable elastomer, of a polar water-soluble backbone polymer having grafted thereon (B) from about 60 to 80 weight percent, same basis, of a copolymer of a major proportion of one or more esters of acrylic acid and a minor proportion of an active halogen containing monoethylenically unsaturated ester or ether comonomer.

2. A composition according to claim 1 wherein said backbone polymer is polyacrylamide or a copolymer of a major proportion of acrylamide and a minor proportion of an ethylenically unsaturated comonomer selected from the group consisting of methacrylamide, acrylonitrile, methacrylonitrile, acrylic acid, methacrylic acid, maleic acid and fumaric acid.

3. A composition according to claim 2 wherein said polar, water-soluble polymer (A) is polyacrylamide and said copolymer (B) is a copolymer of butyl acrylate and vinyl chloroacetate.

4. A composition according to claim 2 wherein said polar, water-soluble polymer (A) is a copolymer of acrylamide and acrylonitrile and said copolymer (B) is a copolymer of butyl acrylate and vinyl chloroacetate.

5. A composition according to claim 2 wherein said polar, water-soluble polymer (A) is a copolymer of acrylamide and acrylic acid and said copolymer (B) is a copolymer of butyl acrylate and vinyl chloroacetate.

6. A composition according to claim 1 wherein said (A) comprises 25 to 30 weight percent of said composition.

7. A method for the preparation of a sulfur vulcanizable elastomer which comprises forming a mixture of about 20 to 40 percent, by weight, of a polar, water-soluble backbone polymer and about 60 to 80 percent, by weight, of a mixture of a major portion of one or more esters of acrylic acid and a minor portion of a monoethylenically unsaturated ester or ether comonomer containing an active halogen for vulcanization, adding thereto a suitable amount of a free radical catalyst and polymerizing said mixture of monomers in the presence of said backbone polymer at a temperature of about 60° to 80° C.

8. The cured composition of claim 1.
9. The cured composition of claim 3.
10. The cured composition of claim 4.
11. The cured composition of claim 5.